United States Patent
Minter et al.

(10) Patent No.: US 10,651,488 B2
(45) Date of Patent: May 12, 2020

(54) BODY STRUCTURE ELEMENT FOR A VEHICLE WITH INTEGRATED HUMIDIFIER

(71) Applicants: VOLKSWAGEN AG, Wolfsburg (DE); AUDI AG, Ingolstadt (DE)

(72) Inventors: Frank Minter, Braunschweig (DE); Daniel Schütz, Lehre (DE); Jürgen Stieg, Isenbüttel (DE)

(73) Assignees: VOLKSWAGEN AG, Wolfsburg (DE); AUDI AG, Ingolstadt (DE)

( * ) Notice: Subject to any disclaimer, the term of this patent is extended or adjusted under 35 U.S.C. 154(b) by 563 days.

(21) Appl. No.: 15/454,933

(22) Filed: Mar. 9, 2017

(65) Prior Publication Data
US 2017/0263957 A1  Sep. 14, 2017

(30) Foreign Application Priority Data
Mar. 9, 2016  (DE) .................. 10 2016 203 890

(51) Int. Cl.
| | |
|---|---|
| *H01M 2/10* | (2006.01) |
| *H01M 8/04082* | (2016.01) |
| *H01M 8/04119* | (2016.01) |
| *H01M 8/04291* | (2016.01) |
| *H01M 8/1004* | (2016.01) |

(Continued)

(52) U.S. Cl.
CPC ......... *H01M 8/04149* (2013.01); *B60L 50/71* (2019.02); *B60L 50/72* (2019.02); *H01M 2/1077* (2013.01); *H01M 2/1083* (2013.01); *H01M 8/04141* (2013.01); *H01M 8/04201* (2013.01); *H01M 8/04291* (2013.01); *H01M 8/1004* (2013.01); *H01M 8/1007* (2016.02); *H01M 8/241* (2013.01); *H01M 8/2457* (2016.02); *H01M 2008/1095* (2013.01);

(Continued)

(58) Field of Classification Search
None
See application file for complete search history.

(56) References Cited

U.S. PATENT DOCUMENTS

| | | |
|---|---|---|
| 9,061,712 B2 | 6/2015 | Patberg et al. |
| 9,371,009 B2 | 6/2016 | Ishikawa et al. |

(Continued)

FOREIGN PATENT DOCUMENTS

| | | |
|---|---|---|
| DE | 100 00 032 C2 | 7/2002 |
| DE | 102 51 945 B3 | 3/2004 |

(Continued)

*Primary Examiner* — Haroon S. Sheikh
(74) *Attorney, Agent, or Firm* — Seed Intellectual Property Law Group LLP

(57) ABSTRACT

The disclosure relates to a body structure element for increasing the stiffness and/or the crash performance of a body structure of a vehicle, comprising a first channel for a first gas flow with a first gas feed line and a first gas discharge line and comprising means for introducing moisture into the first gas stream. The disclosure relates, in other words, to the functional integration of a humidifier for a fuel cell system into a body structure element and preferably the functional integration of a humidifier for a fuel cell system into crash performance increasing element, in particular, an extrusion profile, and a body structural element. The disclosure also relates to a fuel cell system with a humidifier integrated into a body structure element and a vehicle with such a fuel cell system and/or such a body structure element.

15 Claims, 4 Drawing Sheets

(51) Int. Cl.
  *H01M 8/241*    (2016.01)
  *H01M 8/2457*   (2016.01)
  *B60L 50/72*    (2019.01)
  *B60L 50/71*    (2019.01)
  *H01M 8/1007*   (2016.01)
  *H01M 8/1018*   (2016.01)

(52) U.S. Cl.
  CPC ............... *H01M 2250/20* (2013.01); *H01M 2300/0082* (2013.01); *Y02T 90/32* (2013.01)

(56) References Cited

U.S. PATENT DOCUMENTS

| | | |
|---|---|---|
| 2006/0238001 A1 | 10/2006 | Konermann et al. |
| 2007/0052262 A1 | 3/2007  | Wolf |
| 2015/0129336 A1 | 5/2015  | Schneider |

FOREIGN PATENT DOCUMENTS

| | | |
|---|---|---|
| DE | 10 2004 049 393 A1 | 7/2005 |
| DE | 10 2005 061 506 A1 | 7/2007 |
| DE | 10 2011 051 698 A1 | 1/2013 |
| DE | 10 2013 223 105 A1 | 5/2015 |
| DE | 10 2015 204 079 A1 | 9/2015 |

BODY STRUCTURE ELEMENT FOR A VEHICLE WITH INTEGRATED HUMIDIFIER

BACKGROUND

Technical Field

The disclosure relates to a body structure element designed to increase the crash performance and/or stiffness of a vehicle body structure, a fuel cell system with such a body structure element and a vehicle with a body structure including such a body structure element.

Description of the Related Art

Vehicles, in particular motor vehicles, usually have a body structure, which is understood to be a supporting frame of a vehicle for the purposes of this application. Depending on the design of the vehicle, the body structure may be a skeleton body, a self-supporting body or a chassis. The body structure is formed of body structure elements and is adapted to absorb forces during normal operation of the vehicle and in case of accidents.

The body structure elements forming the body structure are detachably or nondetachably connected to each other. The body structure can also be designed as a monolithic structure. The body structure elements are at least functionally distinguishable, for example, as cross beams and side beams. The body structure may further comprise also other body structure elements, for example bumpers, which are connected to the body structure. The common feature of all body structure elements is that they increase the stiffness and/or the crash performance of the body structure.

An increase in the crash performance of a body structure is achieved in the context of this application by the fact that body structure elements connected with the body structure are deflected in accident situations in a targeted manner in order to absorb forces and to prevent a deformation of the body structure itself. Preferably, a plastic deformation of the body structure elements and the conversion of movement energy into heat, in other words dissipation, take place. The stiffness of a body structure is ensured or increased in the context of this application in particular by the body structure elements that form the body structure. It goes without saying that the stiffness of the body structure in an accident situation also contributes significantly to the protection of vehicle occupants.

As a rule, additional body components, such as flaps, covers or linings, are attached to a car body structure. Depending on the type of body structure, similar components of a vehicle can be part of the body structure or constitute body components. This is demonstrated in particular by the comparison of a chassis and a self-supporting body. Within the scope of this application, body components and body structure elements of a vehicle always differ. Furthermore, all additional components of the vehicle, in particular the drive and all other aggregates of the vehicle, are at least indirectly fastened to the body structure. In addition to heating and cooling aggregates, the aggregates of the vehicle include also aggregates for the energy supply of the vehicle. In addition to energy storage units, a fuel cell or a fuel cell system can, in particular, also be attached to the body structure.

Fuel cells use the chemical conversion of a fuel with oxygen to water to generate electrical energy. For this purpose, fuel cells as a core component have a so-called membrane electrode arrangement (MEA) comprising a proton-conducting membrane and electrodes arranged on both sides thereof. During the operation of the fuel cell, hydrogen $H_2$ or a hydrogen-containing gas mixture is fed to the anode as a fuel and is electrochemically oxidized there while giving up electrons ($H_2 \rightarrow 2\ H^+ + 2\ e^-$). The protons $H^+$ are transported from the anode area into the cathode area via the membrane, which insulates two reaction areas in a gas-tight manner and electrically from each other. The electrons $e^-$ provided at the anode can be used to perform electrical work, after which they are conducted to the cathode. The said cathode is also supplied with oxygen or an oxygen-containing gas mixture, so that a reduction of the oxygen occurs while taking up the electrons ($\frac{1}{2}\ O_2 + 2\ e^- \rightarrow O^{2-}$). The oxygen anions formed react in the cathode area with the protons transported via the membrane to form water ($2\ H^+ + O^{2-} \rightarrow H_2O$).

In order to ensure the ionic conductivity of the electrolytes or of the membranes of the MEA, these have to be constantly moistened. For this purpose, a humidifier is integrated in an anode/cathode exhaust path and in an anode/cathode supply path of the MEA in order to extract moisture from the water-laden fuel cell exhaust gases and to supply this moisture to the freshly supplied operating media. Water vapor permeable membranes, which prevent the mixing of the exhaust gases with the fresh operating media, are generally used for this purpose.

Hitherto, humidifiers have been designed as pure functional elements of a fuel cell system and as independent components and are generally arranged in the periphery of the fuel cell system. Depending on the vehicle concept, the humidifiers are placed in the front section, in particular in the engine compartment, or in the rear section of a vehicle, and are connected there to the body structure. For this purpose, attachment points are provided on the body structure in order to ensure a secure mounting of the humidifier. The arrangement of the humidifier of a fuel cell system always leads to a reduction in the installation space available in a vehicle.

BRIEF SUMMARY

The object of the disclosure is to overcome the disadvantages of the prior art and to reduce the installation space requirement for a fuel cell system, in particular for the humidifier of a fuel cell system, in a vehicle. A high design freedom with regard to the arrangement of the fuel cell system, in particular of the humidifier of a fuel cell system, is to be ensured thereby.

This object is achieved by a body structure element according to claim 1, by a fuel cell system according to claim 9 and by a vehicle according to claim 10.

The object is achieved by a body structure element the purpose of which is to enhance the stiffness and/or the crash performance of a vehicle's body structure, whereby the body structure element comprises a first channel for a first gas stream, in particular a first gas stream to be humidified, with a first gas feed line and a first gas discharge line as well as means for introducing moisture into the first gas stream.

According to the disclosure, a humidifier of a fuel cell system, which is generally characterized by at least one first channel for a first gas stream (with a first gas feed line and a first gas discharge line) and means to introduce moisture into the first gas stream, is integrated into a body structure element of a body structure of a vehicle. The functional integration of the humidifier of a fuel cell system into a body structure element is advantageous in the sense that less installation space will be required in the vehicle. Likewise, the integrated humidifier can be advantageously designed, either in parts or as a whole, so as to dissipate mechanical energy by means of plastic deformation. The integration of the humidifier into the body structure improves thus also the crash performance of the body structure element.

In a preferred embodiment of the body structure element, the means for introducing moisture comprise a second channel for a second, fluid-laden fluid stream (in particular gas stream) with a second fluid feed line (in particular gas feed line) and a second fluid discharge line (in particular gas discharge line) and a water vapor permeable membrane. In this case, the first channel and the second channel are separated from one another at least in sections by the water vapor permeable membrane. The first channel and the second channel are preferably designed in such a way that the first gas stream and the second gas stream do not mix within the housing. The membrane is preferably designed in such a way to allow the water steam from the second gas stream to enter the first gas stream.

In a likewise preferred embodiment, the body structure element comprises, at least in sections, an outer wall which encloses a volume of the body structure element. In particular, the outer wall enclosing the volume of the body structure element comprises, at least in sections, a closed cross-section. Thus, the body structure element is at least partially formed as a hollow body with a cavity enclosed by the outer wall. The first channel and the means for introducing moisture into the first gas stream, in other words the humidifier, are preferably placed in the cavity. The body structure element is preferably designed, at least in sections, as a hollow profile, whereby an extruded hollow profile is particularly preferred. Likewise preferred as the body structure element is a hollow body with a different primary form or remodeled form or assembled from several components, for example, a welded or riveted hollow body.

The integration of the humidifier into the body structure element takes place preferably by introducing at least one water vapor permeable membrane into the volume of the body structure element enclosed by the outer wall, whereby at least one first and at least one second channel are formed or separated from each other. In this embodiment, the body structure element has additionally suitable distributor regions for supplying and discharging a first and a second gas stream into or from at least one first and one second channel, respectively. The distributor regions are preferably integrated into the body structure element. The body structure element has then only two gas feed lines and two gas discharge lines. It is also preferred to have the distributor regions detachably connected to the body structure element. Such distributor regions are known, in particular, for humidifiers with water vapor permeable hollow fibers or plate membranes, for example from U.S. Pat. No. 6,953,635 B2 and DE 10 2012 018 863 A1.

The integration of a humidifier into a body structure element is also preferably effected by introducing a humidifier module into the cavity of the body structure element and by fixing the humidifier module therein. The shape of the humidifier module is adapted to the cavity of a body structure element, wherein the humidifier module itself has at least one first channel for a first gas stream, at least one second channel for a second gas stream, and at least one water vapor permeable membrane that separates, at least in sections, at least one first and at least one second channel. The humidifier module is preferably fixed in the cavity by means of a firmly bonded, form-fitting and/or force-fitting connection. The humidifier module is also preferably inserted into the body structure element and is clamped therein. In this case, the humidifier module is preferably clamped by means of distributor regions which are detachably connected to the body structure element on one or two sides and/or by fastening the body structure element to the body structure. As an advantage, this embodiment requires only one cavity of the body structure element and means for clamping the humidifier module or for fastening the distributor regions to the body structure element. The humidifier module can advantageously be produced separately, for example by molding a housing by means of injection molding and by placing at least one membrane in this housing. It is particularly preferable for the body structure element to be designed as an energy-absorbing bumper of a vehicle, wherein the humidifier module is arranged in the cavity that is plastically deformable in order to increase the crash performance.

In a likewise preferred embodiment, the body structure element is designed at least in sections as an extrusion profile with at least two chambers. The minimum of two chambers of the extrusion profile have each a closed cross-section, whereas the extrusion profile as a whole can have an open cross-section. For example, the extrusion profile is designed as a U-shaped profile in which transverse struts in the profile corner regions delimit each one chamber. The extrusion profile is likewise preferably configured as an extruded hollow profile, whereby a multi-chamber extruded hollow profile is particularly preferred. The extrusion profile is preferably designed as a resilient bumper of a vehicle and is, in particular, connected to the body structure by way of plastically deformable crash boxes. The extrusion profile is also preferably designed as a vehicle's cross beam or as a vehicle's side member.

In a particularly preferred embodiment of the body structure element according to the disclosure, a cross-section of the extrusion profile has profile webs to separate the minimum of two chambers. The orientation and/or wall thickness of the profile webs are thereby adapted to the installation position of the body structure element in the body structure. In particular, the orientation and the wall thickness of the profile webs are adapted to the loads to be expected in accident situations of the vehicle. For example, the profile webs of a front section cross beam are essentially oriented in the direction of travel and thus in the direction of the maximum force to be expected during [rear-end] collisions. On the other hand, the profile webs of a side member are oriented in the direction of the force to be expected during collisions on the side of the car, for example, essentially transversely to the direction of travel of the vehicle. The wall thickness of the profile webs also preferably increases in the direction of the load to be expected.

Likewise preferred are the profile webs for the dissipation of mechanical energy by means of plastic deformation. In other words, the profile webs are designed in such a way that they yield under a certain minimum force effect. In particular, the multi-chamber extruded hollow profile reacts to the effects of force below the minimum force effect by elastic deformation and on the effects of force above the minimum force effect by plastic deformation. This is made possible, in particular, by the fact that the webs have a corresponding material thickness and/or a corresponding type of material and/or predetermined breaking points, which in each case or in combination are designed so that they bend and/or break under the minimum force effect.

In a preferred embodiment, at least one chamber of an extrusion profile, in particular a multi-chamber extruded hollow profile, comprises the first channel and the means for humidifying the first gas stream. The chamber preferably comprises the first and the second channel and a water vapor permeable membrane separating the first and second channels at least in sections. In other words, humidifier modules as described above may be integrated into one or a plurality of chambers of a multi-chamber extruded hollow profile. Also preferably, at least one first and one second channel can be formed in at least one chamber of a multi-chamber extruded hollow profile by introducing at least one water vapor permeable membrane, as described above. For example, a multi-chamber extruded hollow profile with a plurality of circular cylindrical cavities in each cavity may comprise a water vapor permeable hollow fiber, so that a first and a second channel are formed coaxially in each cavity. A first gas flow is introduced into each first channel through correspondingly configured distributor regions, as described above, and a second gas stream is introduced into each second channel.

In a likewise preferred embodiment, an extruded profile, in particular a multi-chamber extrusion profile, has at least one additional chamber which is filled with a foamed material. Preferably, no humidifier module and no water vapor permeable membrane are integrated into this additional chamber. The foamed material may be a foamed plastic or a foamed metal, in particular aluminum. Alternatively, the extrusion profile comprises at least one additional chamber, which is filled with a honeycomb structure, whereby an aluminum honeycomb structure is particularly preferred. The introduction of a foamed material or a honeycomb structure into an additional chamber of a body structure element according to the disclosure in the form of an extrusion profile advantageously allows an additional increase in the crash performance of the body structure element with a minimal additional weight of the body structure element. It is particularly preferred that the material resistance of the foamed material and/or the honeycomb structure is designed in such a way that a plastic deformation, in other words a dissipation of mechanical energy, occurs above the minimum force impact.

In a particularly preferred embodiment of the body structure element according to the disclosure, a humidifier with at least one water vapor permeable membrane in the form of a water vapor permeable plate membrane is integrated into the body structure element. The first channel and the second channel are separated from each other by at least one water vapor permeable plate membrane. Preferably, a plurality of plate membranes are arranged substantially plane-parallel to each other in the body structure element, wherein each plate membrane is arranged between a part of the first gas stream and a part of the second gas stream. Thus, the first channel is divided into a plurality of first channels and the second channel is divided into a plurality of second channels. First and second channels are preferably arranged essentially parallel to one another and alternately successively in the body structure element. Likewise, the first gas stream and the second gas stream flow preferably parallel or antiparallel through the first and the second channels.

Likewise preferred is a humidifier with at least one water vapor permeable membrane in the form of a water vapor permeable hollow fiber integrated into the body structure element, wherein the first or second gas stream flows around the hollow fiber. Each hollow fiber comprises a hollow fiber cavity, wherein at least one hollow fiber cavity of at least one hollow fiber is traversed by the second or first gas stream and thus forms at least a second channel. If a plurality of hollow fibers are arranged jointly in an enclosed volume of a body structure element or a chamber of an extrusion profile, the gas stream flowing around the hollow fiber flows preferably parallel, antiparallel or transversely to the hollow fibers. If, in each case, a hollow fiber is arranged in a hollow-cylindrical chamber coaxially arranged into a multi-chamber extrusion hollow profile, the gas stream flowing around the hollow fiber preferably flows parallel or antiparallel to the hollow fiber.

In a further embodiment of the body structure element according to the disclosure, the orientation and/or wall thickness of at least one water vapor permeable membrane is adapted to the installation position of the body structure element in the body structure. In particular, the orientation and/or the wall thickness of at least one water vapor permeable membrane is adapted to the loads to be expected in accident situations of the vehicle. For example, the water vapor permeable membranes of a humidifier integrated into a front section cross beam are oriented essentially transversely to the direction of travel and thus transversely to the direction of the maximum force to be expected in the event of [rear-end] collisions. On the other hand, the water vapor permeable membranes of a humidifier integrated into a side member are oriented transversely to the direction of the force to be expected during collisions into the side of the car, for example, essentially parallel to the direction of travel of the vehicle. Also preferably, the wall thickness of the membranes increases in the direction of the load to be expected.

Likewise preferred are the water vapor permeable membranes and/or membrane holding elements for absorbing or dissipating mechanical energy by means of plastic deformation. In other words, the water vapor permeable membranes and/or membrane holding elements are designed so that they yield under a certain minimum force effect. In particular, the water vapor permeable membranes and/or membrane holding elements react to the effects of force below the minimum force effect by elastic deformation and on the effects of force above the minimum force effect by plastic deformation. This is made possible, in particular, by the fact that the water vapor permeable membranes and/or membrane holding elements have a corresponding material thickness and/or a corresponding type of material and/or predetermined breaking points, which respectively or in combination are designed in such a way that they bend and/or break under the minimum force effect.

The body structure element according to the disclosure is particularly preferred to be a front section cross beam, a front section side member, a cockpit module beam, a subfloor cross beam, a subfloor side member, a sill reinforcement part, a rear section cross beam, a rear section side member and a rear bumper cross beam. These structure elements are particularly preferred to be extrusion profiles, preferably multi-chamber extruded hollow profiles. If the body structure element is designed as a front bumper cross beam, it is particularly preferred to be connected to a front section side member by means of a connecting element designed as a plastic deformable crash box. The aforementioned body structure elements also preferably each have at least one connecting element for connecting to an additional body structure element and/or a body module component.

Likewise, the disclosure relates to a fuel cell system comprising a fuel cell stack, an anode supply and a cathode supply. The anode supply includes an anode supply path for supplying an anode operating medium to the fuel cell stack and an anode exhaust path for discharging an anode exhaust from the fuel cell stack. The cathode supply has a cathode supply path for supplying a cathode operating medium to the fuel cell stack and a cathode exhaust path for discharging a cathode exhaust from the fuel cell stack. According to the disclosure, the fuel cell system has a body structure element arranged in the anode supply and/or the cathode supply, as described above. In other words, the humidifier of the fuel cell system is integrated in a body structure element.

According to the disclosure, the first gas supply line and the first gas discharge line of the first channel of the body structure element are arranged in an anode supply path or a cathode supply path of the fuel cell system. The first gas stream is preferably an anode operating gas stream or a cathode operating gas stream. In a preferred embodiment, the fuel cell system has a body structure element with a second channel with a second gas feed line and a second gas discharge line. The second channel is arranged in an anode exhaust path or a cathode exhaust path of the fuel cell system, and the second gas stream is an anode exhaust stream or a cathode exhaust stream. The first channel and the second channel are separated from one another at least in sections by a water vapor permeable membrane. The first and the second gas feed line and the first and second gas discharge line are preferably arranged in such a way that the first gas stream and the second gas stream are guided as cross currents or counter currents to each other.

The disclosure also relates to a vehicle with a body structure including a body structure element as described above and/or with a fuel cell system as described above. The vehicle is preferably an electric vehicle in which an electrical energy generated by the fuel cell system serves to supply an electric traction motor and/or a traction battery.

BRIEF DESCRIPTION OF THE SEVERAL VIEWS OF THE DRAWINGS

The various embodiments of the disclosure mentioned in this application can be advantageously combined with one another, unless otherwise stated in the individual case.

Further preferred embodiments of the disclosure result from the remaining features mentioned in the dependent claims.

Figure 1:
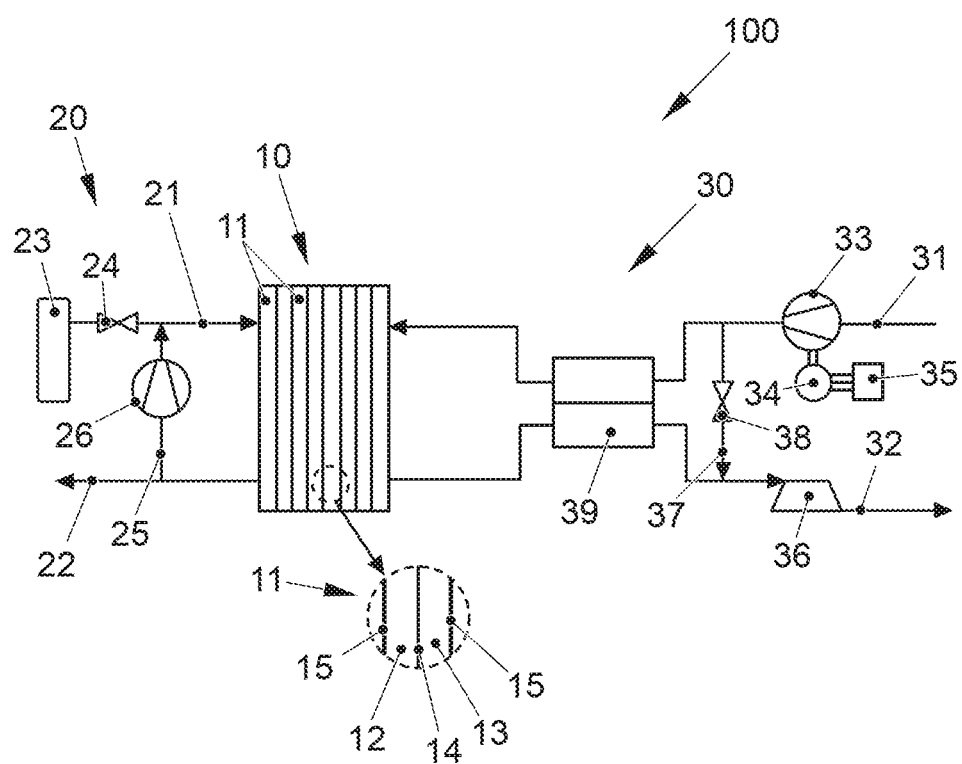
Figure 2:
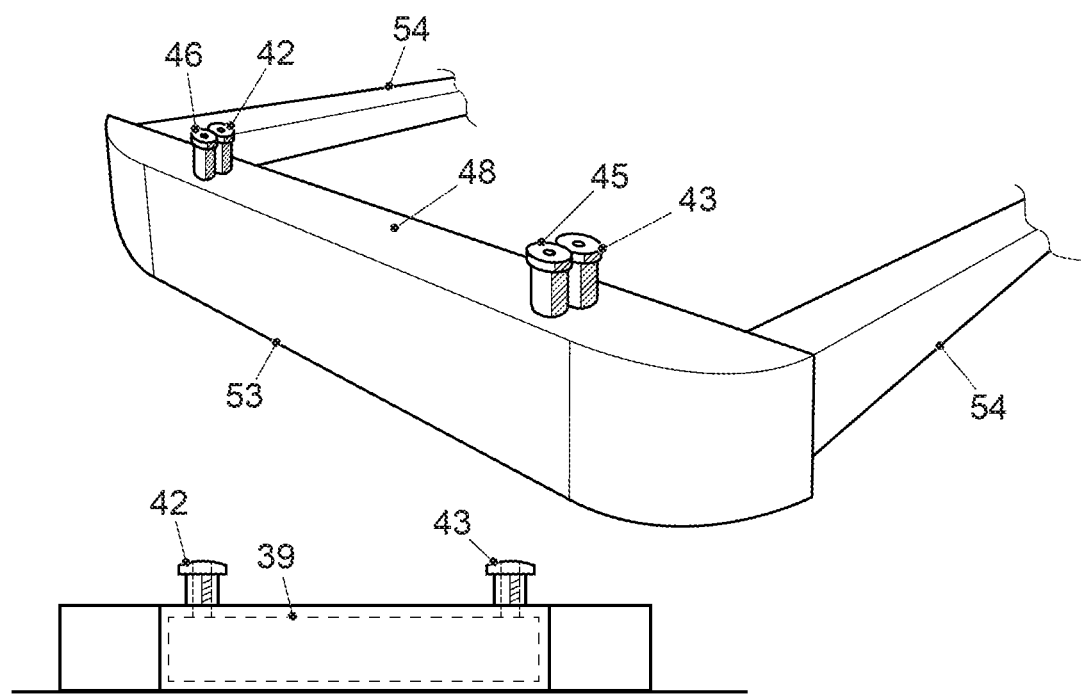
Figure 3:
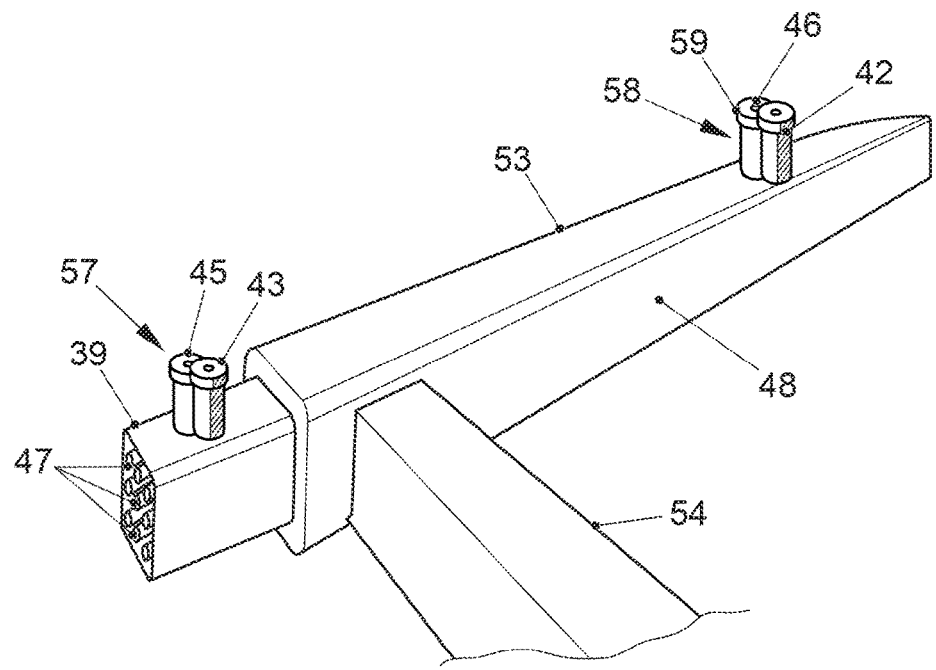
Figure 4:
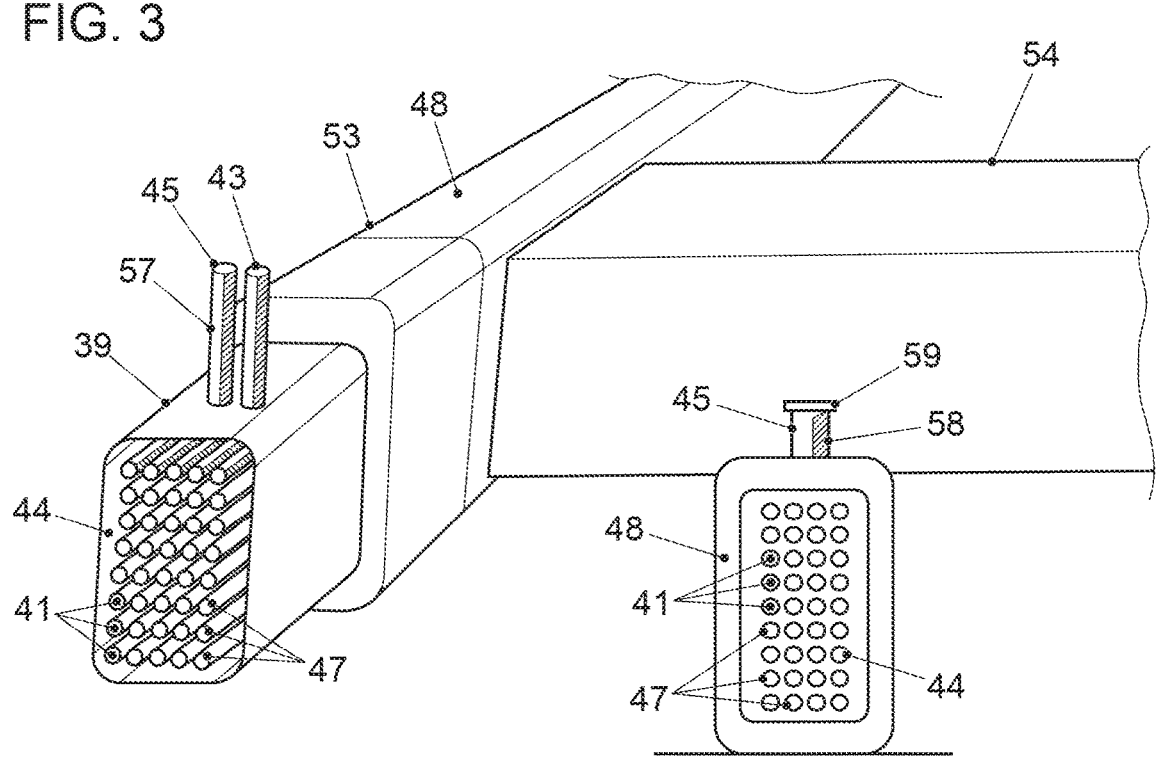
Figure 5:
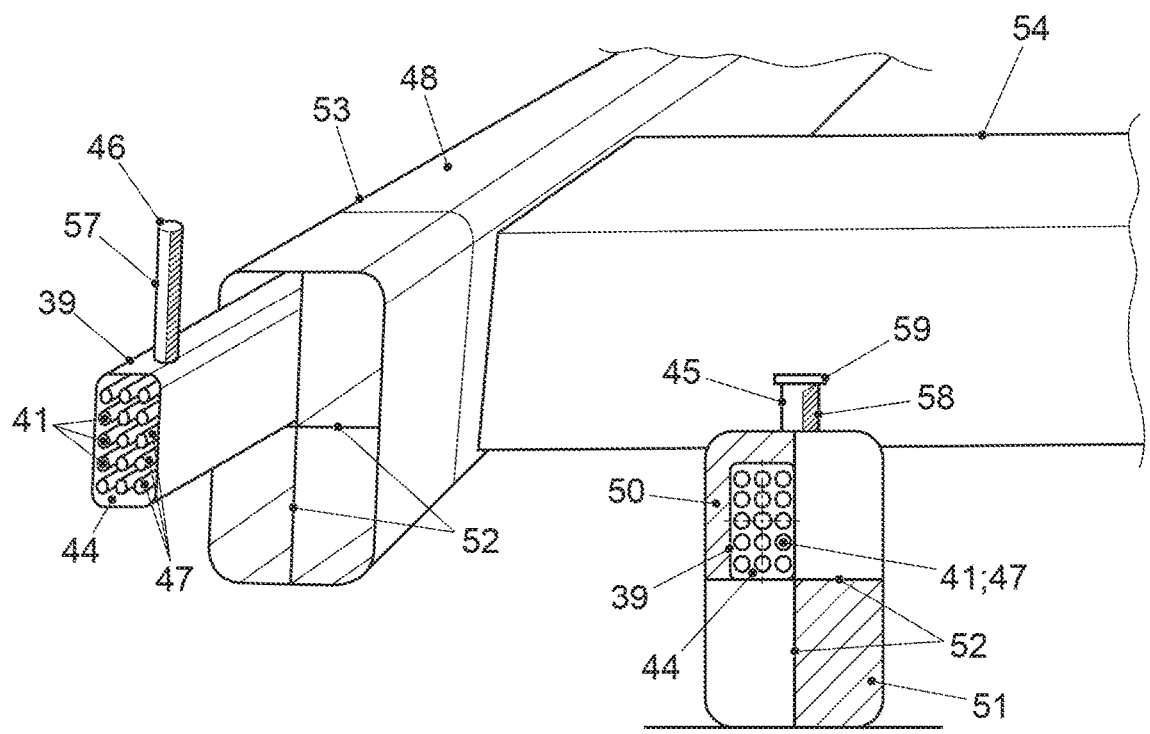
Figure 6:
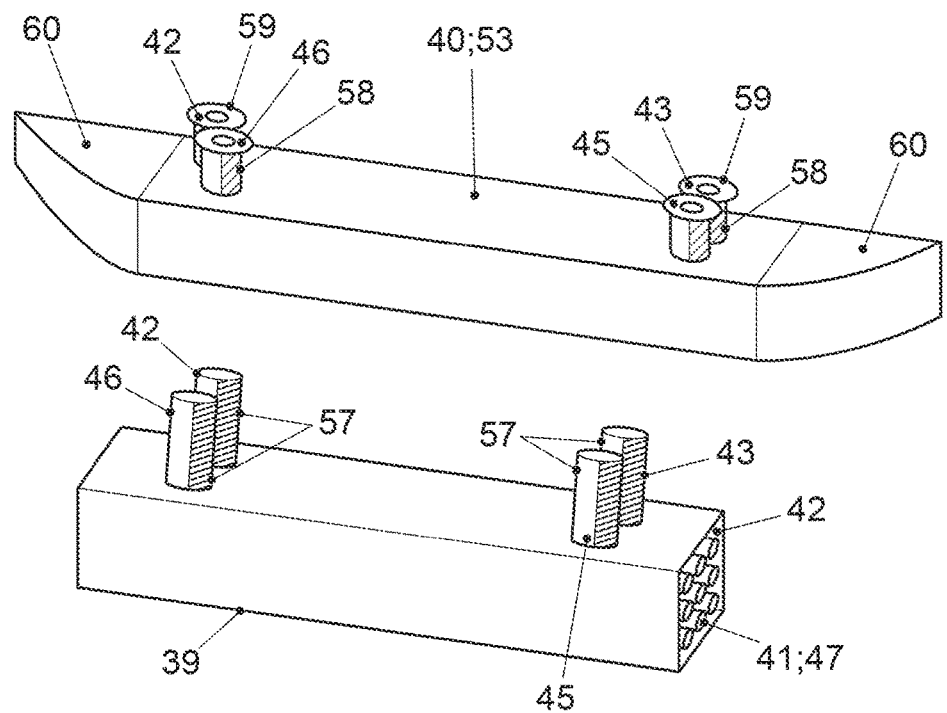
Figure 7:
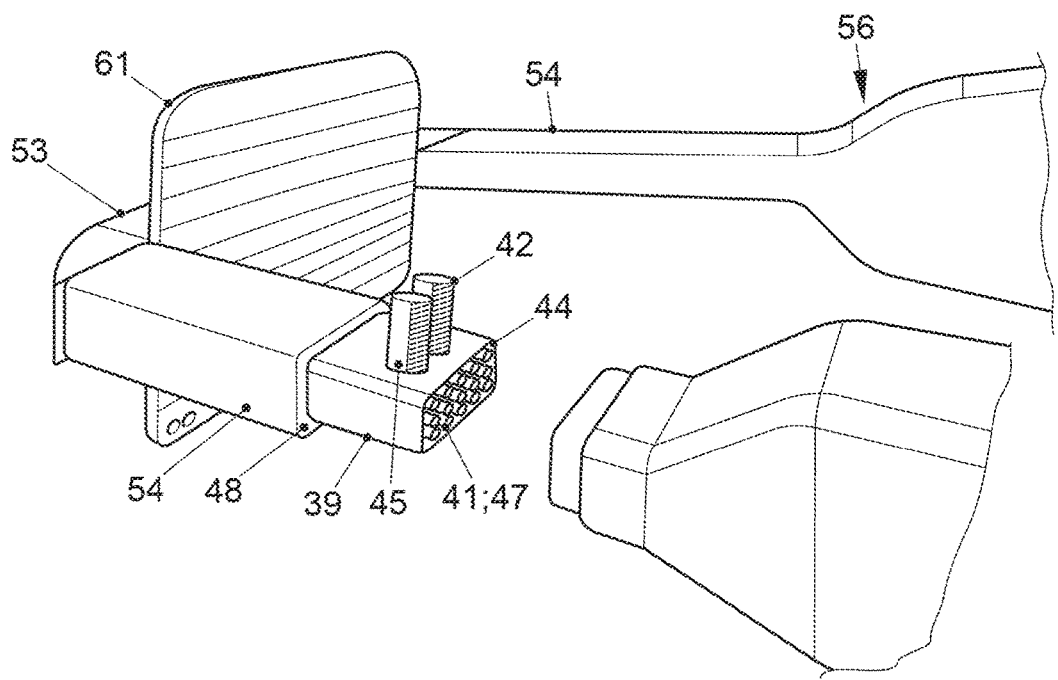
Figure 8:
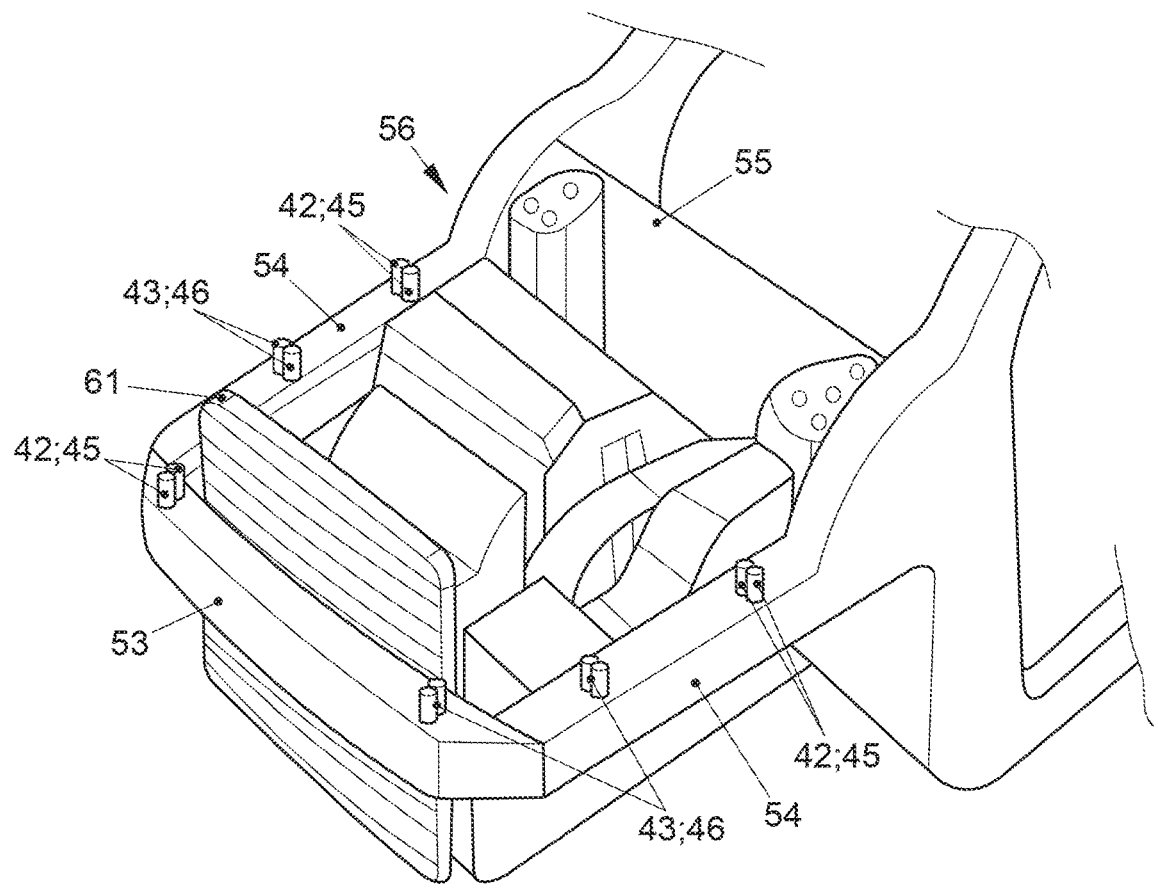

The disclosure is explained below in exemplary embodiments with reference to the accompanying drawings. The figures show:

FIG. 1 is a block circuit diagram of a fuel cell system according to a preferred embodiment;

FIG. 2 is a perspective view of a body structure element according to a first embodiment of the disclosure in the mounting position and a schematic side view of this body structure element;

FIG. 3 is a detailed view of a body structure element according to a second embodiment of the disclosure in the mounting position;

FIG. 4 is a detailed view of a body structure element according to the second embodiment of the disclosure in the mounting position and a schematic representation of a cross-section of this body structure element;

FIG. 5 is a detailed view of a body structure element according to a third embodiment of the disclosure in the mounting position and a schematic representation of a cross-section of this body structure element;

FIG. 6 is a schematic representation of a modularly designed body structure element according to one embodiment of the disclosure;

FIG. 7 is a detailed view of a body structure element according to a fourth embodiment of the disclosure in an installation position within a body structure; and FIG. 8 is a schematic representation of a body structure with body structure elements arranged therein according to an embodiment of the disclosure.

DETAILED DESCRIPTION

FIG. 1 shows a fuel cell system, denoted overall by 100, according to a preferred embodiment of the present disclosure. The fuel cell system 100 is part of a vehicle (not shown), in particular an electric vehicle, which has an electric traction motor which is supplied with electrical energy by the fuel cell system 100.

The fuel cell system 100 comprises, as a core component, a fuel cell stack 10 which has a multiplicity of stacked individual cells 11 embodied by alternately stacked membrane electrode assemblies (MEA) 14 and bipolar plates 15. Each individual cell 11 thus comprises, in each case, an MEA 14 which has an ionically conductive polymer electrolyte membrane (not shown in detail), as well as catalytic electrodes arranged on both sides, namely an anode and a cathode which catalyze the respective partial reaction of the fuel cell conversion and may in particular be designed as coatings on the membrane. The anode and cathode electrodes comprise a catalytic material, for example platinum, which is supported on an electrically conductive carrier material with a large specific surface, for example a carbon-based material. An anode space 12 is thus formed between a bipolar plate 15 and the anode, and the cathode space 13 between the cathode and the next bipolar plate 15. The bipolar plates 15 serve to supply the operating media into the anode and cathode chambers 12, 13 and also establish the electrical connection between the individual fuel cells 11. Optionally, gas diffusion layers can be arranged between the membrane electrode arrangements 14 and the bipolar plates 15.

In order to supply the fuel cell stack 10 with the operating media, the fuel cell system 100 comprises, on the one hand, an anode supply 20 and, on the other hand, a cathode supply 30.

The anode supply 20 comprises an anode supply path 21, which serves to supply an anode operating medium (fuel), for example hydrogen, to the anode chambers 12 of the fuel cell stack 10. For this purpose, the anode supply path 21 connects a fuel reservoir 23 with an anode inlet of the fuel cell stack 10. The anode supply 20 also comprises an anode exhaust path 22 which discharges the anode exhaust gas from the anode chambers 12 via an anode outlet of the fuel cell stack 10. The anode operating pressure on the anode sides 12 of the fuel cell stack 10 is adjustable via an actuating means 24 in the anode supply path 21. The anode supply 20 may have a fuel recirculation line 25 which connects the anode exhaust path 22 to the anode supply path 21, as shown. The recirculation of fuel is customary in order to return the mostly over-stoichiometric supplied fuel to the stack and to use it. An additional actuating means 26, with which the recirculation rate is adjustable, is arranged in the fuel recirculation line 25.

The cathode supply 30 comprises a cathode supply path 31 which supplies an oxygen-containing cathode operating medium to the cathode chambers 13 of the fuel cell stack 10, in particular air which is sucked in from the environment. The cathode supply 30 also comprises a cathode exhaust path 32 which discharges the cathode exhaust gas (in particular the exhaust air) from the cathode spaces 13 of the fuel cell stack 10 and supplies this, if appropriate, to an exhaust system (not shown). A compressor 33 is arranged in the cathode supply path 31 for conveying and compressing the cathode operating medium. In the embodiment shown, the compressor 33 is designed as a compressor which is driven mainly by an electric motor, the drive of which is effected via an electric motor 34 equipped with a corresponding power electronics system 35. The compressor 33 may also be driven by a turbine 36 (optionally with variable turbine geometry) disposed in the cathode exhaust path 32 via a common shaft (not shown).

In accordance with the illustrated embodiment, the cathode supply 30 can also have a wastegate line 37 which connects the cathode supply line 31 to the cathode exhaust line 32, i.e., represents a bypass of the fuel cell stack 10. The wastegate line 37 allows excess air mass flow past the fuel cell stack 10 without driving down the compressor 33. An actuating means 38 arranged in the wastegate line 37 serves to control the amount of the cathode operating medium bypassing the fuel cell stack 10. All actuating means 24, 38 of the fuel cell system 100 can be designed as controllable or non-controllable valves or flaps. Corresponding additional actuating means may be arranged in the lines 21, 22, 31 and 32 in order to be able to isolate the fuel cell stack 10 from the environment.

The fuel cell system 100 also includes a humidifier 39. On the one hand, the humidifier 39 is arranged in the cathode supply path 31 in such a way that it is flowed through by the cathode operating gas. On the other hand, the humidifier 39 is arranged in the cathode exhaust path 32 in such a way that the cathode exhaust gas flows through it. Alternatively or additionally, the humidifier 39 may be arranged in the anode supply 20, in particular between the anode supply path 21 and the anode exhaust path 22 (not shown). A humidifier 39 is generally formed by a humidifier module 39 arranged in a housing, wherein the humidifier module 39 fulfills the functionality of the humidification.

Various further details of the anode and cathode supply 20, 30 are not shown in the simplified FIG. 1 for reasons of clarity. Thus, the anode exhaust gas line 22 can open into the cathode exhaust gas line 32 so that the anode exhaust gas and the cathode exhaust gas are removed via a common exhaust system.

FIG. 2 shows a body structure element 40 according to a first embodiment of the present disclosure as part of a body structure, that is, in an installation position, in a perspective illustration, as well as a schematic side view of this body structure element 40. The body structure element 40 is designed as a front section cross beam 53, in particular as a front section crash cross beam 53, and is connected at the end to a front section side member 54 of a body structure.

The body structure element 40 according to the first embodiment has a first channel (not shown) for a first gas stream to be humidified, wherein the first channel has a first gas feed line 42 and a first gas discharge line 43. The body structure element 40 also comprises means for humidifying the first gas stream, which is a second channel (not shown) for a second, moisture-laden gas stream. The second channel comprises a second gas feed line 45 and a second gas discharge line 46. The gas feed lines 42, 45 and gas discharge lines 43, 46 are arranged such that the first gas stream and the second gas stream in the humidifier flow in opposite directions. In the interior of the body structure element 40, the first channel and the second channel are separated from one another at least in sections by a water vapor permeable membrane (not shown). Thus, a humidifier module 39 for a fuel cell system 100 is integrated into the body structure element 40, wherein the humidifier module 39 is indicated in the schematic side view of FIG. 2 by a broken line.

Detailed illustrations of a body structure element 40 according to the disclosure according to a second embodiment of the disclosure are shown in FIGS. 3 and 4. The body structure element 40 is designed as a front section crash cross beam 53. The connection to a front section side member 54 is shown on one side. The body structure element 40 has an outer wall 48 with a closed cross-section, which encloses a volume. A humidifier module 39 is arranged in the volume delimited by the outer wall 48 and fixed by means of an adhesive. The humidifier module 39 is designed as an extruded plastic body in which a plurality of water vapor permeable hollow fiber membranes 47 are arranged. The stabilization of the hollow-fiber membranes 47 takes place by means of membrane structures (not shown) in the form of end caps, which are not shown and are pushed onto the humidifier module 39 at the end.

The humidifier module 39 has a first gas feed line 42 and a first gas discharge line 43 which are connected to the hollow spaces of the plurality of hollow fiber membranes 47 via distributor regions (not shown). The humidifier module 39 has a second gas feed line 45 and a second gas discharge line 46, which are connected to the interior of the humidifier module 39 via distributer regions (not shown). The gas feed lines 42, 45 and gas discharge lines 43, 46 are thereby formed by tubings 57 which are connected in a firmly bonded manner to the humidifier module 39 and inserted into hollow-cylindrical extensions 58 of the outer wall 48. The extensions 58 have flange structures 59 for connection to other structural elements.

In particular, the detailed display and the schematic cross-sectional view of FIG. 4 shows that the volume enclosed by the outer wall of the humidifier module 39 forms a second channel 44 through which a second, moisture-laden gas stream can flow in such a way that it flows around the plurality of hollow fiber membranes 47. At the same time, a first gas stream to be humidified can flow through the hollow spaces of the hollow-fiber membranes 47, which together form a first channel 41. A moisture transport from the second into the first gas stream or from the second channel 44 into the first channel 41 takes place through the water vapor permeable hollow fibers 47 in each case. The plurality of hollow fiber membranes 47 is arranged parallel to its longitudinal extent, that is to say essentially transversely to a straight-ahead direction of travel of a vehicle, in the mounting position of the front section cross beam 53. In an accident situation with increasing deformation of the front section cross beam 53, more and more hollow fiber membranes 47 are plastically deformed and thus increase the crash performance of the cross beam 53.

A detailed view of an alternative third embodiment of the body structure element 40 according to the disclosure is shown in FIG. 5. The body structure element 40 is again designed as a front section crash cross beam 53. According to this embodiment, the front section crash cross beam 53 is designed as a multi-chamber extruded hollow profile and has a plurality of chambers 50, 51, which are separated from each other by profile webs 52. A humidifier module 39 is arranged in a first chamber 50 of the body structure element 40. The humidifier module 39 shown has, similar to the humidifier module 39 described with reference to FIGS. 3 and 4, a plurality of hollow-fiber membranes 47 whose cavities together form a first channel 41 for a first gas stream to be humidified. The humidifier module 39 likewise has a second channel 44 for a second, moisture-laden gas stream.

Unlike the second embodiment, only the second channel 44 has a second gas feed line (not shown) and a second gas discharge line 46 in the form of a tubing 57 in the humidifier module 39 according to the third embodiment. Said lines are again inserted into corresponding extensions 58 with flange structures 59 of the outer wall 48 of the body structure element 40. The first channel 41 formed by the plurality of cavities of the hollow-fiber membranes 47, however, has a first gas feed line (not shown) formed by the sum of the first ends of the plurality of hollow-fiber membranes and a first gas discharge line (not shown) that is formed by the sum of second ends of the plurality of hollow fiber membranes. The first gas feed line and the gas discharge line are preferably formed by distributor regions which are fastened at the end to the front section cross beam 53. It is particularly preferred that the distributor regions are arranged in end caps pushed on both sides on the front section cross beam 53.

The humidifier module 39 according to the third embodiment is fixed in the first chamber 50 by means of a foamed plastic material shown as firmly bonded. The foamed plastic material is likewise arranged in a second chamber 51 of the body structure element 40, 53. The foamed material and the profile webs 52 are arranged to dissipate mechanical energy, that is, to convert mechanical energy into heat by means of plastic deformation. Thus, the foamed material and the profile webs 52 contribute to the crash performance of the body structure element 40. The plurality of hollow fiber membranes 47 is arranged parallel to its longitudinal direction, i.e., essentially transversely to a straight-ahead direction of travel of a vehicle, in the installation position of the cross beam 53. In an accident situation with an increasing deformation of the cross beam 53, more hollow fiber membranes 47 are gradually plastically deformed and thus also absorb mechanical energy. Thus, the integration of the humidifier module 39 into the body structure element 40 additionally increases the crash performance of the front section cross beam 53.

A particularly simple embodiment of a body structure element 40, embodied as a front section crash beam 53, with an integrated humidifier module 39 according to the disclosure is shown in FIG. 6. The humidifier module 39 is provided as a semi-finished product and comprises the complete functionality of a humidifier 39 of a fuel cell system 100. As in the other embodiments, only the first gas feed line 42 and the first gas discharge line 43 must be integrated into a cathode supply path 31 and the second gas feed line 45 and the second gas discharge line 46 must be integrated into a cathode exhaust path 32 of a fuel cell system 100 for the humidifier module 39 as a humidifier 39 of a fuel cell system 100 in operation. The dimensions of the humidifier module 39 are adapted to the dimensions of a cavity of a body structure element 40, 53. The body structure element 40, 53 is formed by an essentially cuboid middle section and end caps 60 fastened thereto on both sides. According to this embodiment, the humidifier module 39 can be inserted into the body structure element 40, 53 by removing at least one end cap 60.

In addition, the tubings 57 of the humidifier module 39 must be inserted into the extensions 58 of the body structure element 40 before the humidifier module 39 is braced by fastening the two end caps 60 in the body structure element 40, 53.

A detailed view of an alternative, fourth embodiment of the body structure element 40 according to the disclosure with an integrated humidifier module 39 is shown in FIG. 7. In this case, a humidifier module 39 is integrated into a body structure element 40 designed as a front section side member 54. The front section side member is shown as part of a body structure 56 shown in a sectional view, to which a radiator 61 is also fastened. The humidifier module 39 is designed analogously to the humidifier module 39 shown in FIGS. 3 and 4 and, like the latter, is arranged in a volume enclosed by the outer wall 48 of the body structure element 40. Identical features of the humidifier module 39 are provided with identical reference symbols and are not explained in detail here. FIG. 7 shows only the first and second gas feed lines 42, 45, although the humidifier module 39 also has first and second gas discharge lines (not shown).

A schematic representation of a body structure 56 of a vehicle with body structure elements 40, 53, 54 arranged therein according to an embodiment of the disclosure is shown in FIG. 8. An engine compartment of the body structure 56 is in this case delimited on one side by a front section cross beam 53 with a radiator 61 fastened thereto and, on both sides, by front section side members 54. The engine compartment is delimited by a cockpit module carrier 55 opposite the front section cross beam 53. The front section cross beam 53 and the front section side member 54 fastened thereto are shown as body structural elements 40 with an integrated humidifier module 39 according to the disclosure. An arrangement, not shown, of a humidifier module 39 in a cockpit module carrier 55 is also preferred.

The invention claimed is:

1. A body structure element of a vehicle, comprising:
   a first gas feed line;
   a first channel for a first gas stream with the first gas feed line;
   a first gas discharge line; and
   a second channel for introducing moisture into the first gas stream between the first gas feed line and the first gas discharge line to increase a moisture content of the first gas stream.

2. The body structure element according to claim 1 wherein the second channel has a second gas feed line and a second gas discharge line and a water vapor permeable membrane, wherein the first channel and the second channel are separated from each other at least in sections by the water vapor permeable membrane.

3. The body structure element according to claim 1, further comprising at least in sections an outer wall with a closed cross-section surrounding a volume of the body structure element and the first channel and the second channel are arranged in the volume.

4. The body structure element according to claim 1, further comprising at least two chambers.

5. The body structure element according to claim 4, further comprising a plurality of profile webs that separate the at least two chambers, the profile webs are adapted to dissipate mechanical energy.

6. The body structure element according to claim 2 wherein the water vapor permeable membrane is at least one water vapor permeable plate membrane arranged in the first channel.

7. The body structure element according to claim 2 wherein at least one of an alignment and a wall thickness of the water vapor permeable membrane is adapted to a mounting position of the body structure element in the body structure and at least one of the water vapor permeable membrane and membrane holding elements are configured to dissipate mechanical energy.

8. The body structure element according to claim 1 wherein the body structure element is one from among a front bumper cross beam, a front section side member, a cockpit module beam, a subfloor cross beam, a subfloor side member, a sill reinforcement part, a rear section cross beam, a rear section side member, and a rear bumper cross beam.

9. The body structure element according to claim 2 wherein the water vapor permeable membrane is a water-vapor-permeable hollow fiber.

10. The body structure element according to claim 9 wherein the second gas stream flows around at least one hollow fiber and at least one hollow fiber cavity forms at least one first channel for the first gas stream.

11. A fuel cell system, comprising:
- a fuel cell stack;
- an anode supply with an anode supply path configured to supply an anode operating medium to the fuel cell stack and with an anode exhaust path configured to discharge an anode exhaust from the fuel cell stack;
- a cathode supply with a cathode supply path configured to supply a cathode operating medium to the fuel cell stack and with a cathode exhaust path configured to discharge a cathode exhaust from the fuel cell stack; and
- a body structure element, arranged in one of the anode supply and the cathode supply, the body structure element including:
- a first gas feed line;
- a first channel for a first gas stream with the first gas feed line;
- a first gas discharge line; and
- a second channel for introducing moisture into the first gas stream between the first gas feed line and the first gas discharge line, wherein the first gas feed line and the first gas discharge line of the first channel area arranged in an anode or cathode supply path of the fuel cell system, and the first gas stream is an anode or cathode operating gas stream.

12. The fuel cell system according to claim 11 wherein the second channel has a second gas feed line and a second gas discharge line and a water vapor permeable membrane, wherein the first channel and the second channel are separated from each other at least in sections by the water vapor permeable membrane.

13. A vehicle, comprising:
- a body structure element;
- a humidifier module in the body structure element;
- a first channel within the humidifier module;
- a first gas input line coupled to the first channel;
- a first gas discharge line coupled to the first channel and in fluid communication with the first gas input line through the first channel.

14. The vehicle of claim 13 wherein the first channel includes a plurality of hollow-fiber membranes positioned in the humidifier module.

15. The vehicle of claim 13, further comprising:
- a second channel within the humidifier module;
- a second gas input line coupled to the second channel; and
- a second gas discharge line coupled to the second channel and in fluid communication with the second gas input line through the second channel.

* * * * *